United States Patent
Kemmler et al.

[11] Patent Number: 5,904,127
[45] Date of Patent: May 18, 1999

[54] METHOD OF CONTROLLING AN ADJUSTABLE OPERATING PARAMETER OF AN INTERNAL COMBUSTION ENGINE WITH DIRECT FUEL INJECTION

[75] Inventors: Roland Kemmler, Stuttgart; Guenter Karl, Esslingen; Peter Hohner, Leinfelden-Echterdingen; Bernd Baur, Esslingen, all of Germany

[73] Assignee: Daimler-Benz AG, Stuttgart, Germany

[21] Appl. No.: 08/950,956

[22] Filed: Oct. 15, 1997

[30] Foreign Application Priority Data

Oct. 16, 1996 [DE] Germany .......................... 196 42 654

[51] Int. Cl.⁶ ..................................................... F02B 17/00
[52] U.S. Cl. ........................................... 123/295; 123/435
[58] Field of Search ..................... 123/295, 305, 123/435

[56] References Cited

U.S. PATENT DOCUMENTS

| | | | |
|---|---|---|---|
| 4,186,701 | 2/1980 | Suzuki et al. | 123/568.27 |
| 4,444,712 | 4/1984 | Sellmaier et al. | 123/435 |
| 4,480,620 | 11/1984 | Tange et al. | 123/295 |
| 4,535,740 | 8/1985 | Ma | 123/435 |
| 5,313,920 | 5/1994 | Matsushita | 123/295 |
| 5,628,290 | 5/1997 | Iida et al. | 123/305 |
| 5,738,074 | 4/1998 | Nakamura et al. | 123/305 |
| 5,749,334 | 5/1998 | Oda et al. | 123/305 |
| 5,769,049 | 6/1998 | Nyomt et al. | 123/435 |
| 5,797,367 | 8/1998 | Iida et al. | 123/295 |

FOREIGN PATENT DOCUMENTS

| | | |
|---|---|---|
| 38 33 465 | 4/1990 | Germany . |
| 43 24 642 | 1/1994 | Germany . |

OTHER PUBLICATIONS

Robert Bosch GmbH, "Kombiniertes Zünd–und Benzineinspritzsystem mit Lambda–Regelung Motronic", 1983.

*Primary Examiner*—Erick R. Solis
*Attorney, Agent, or Firm*—Klaus J. Bach

[57] ABSTRACT

In a method of controlling adjustable operating parameters of an internal combustion engine with direct fuel injection which includes at least one cylinder having a piston delimiting a combustion chamber, a fuel injector and a spark plug, wherein air supplied to the combustion chamber through an air intake passage forms with the fuel injected by the fuel injector a fuel/air mixture which is compressed and produces a plasma cloud which is then ignited by a spark generated between the electrodes of the spark plug, the ionization degree of the plasma cloud is measured and an ionization signal is formed and supplied to an electronic control unit where it is utilized to control at least one operating parameter of the internal combustion engine.

3 Claims, 1 Drawing Sheet

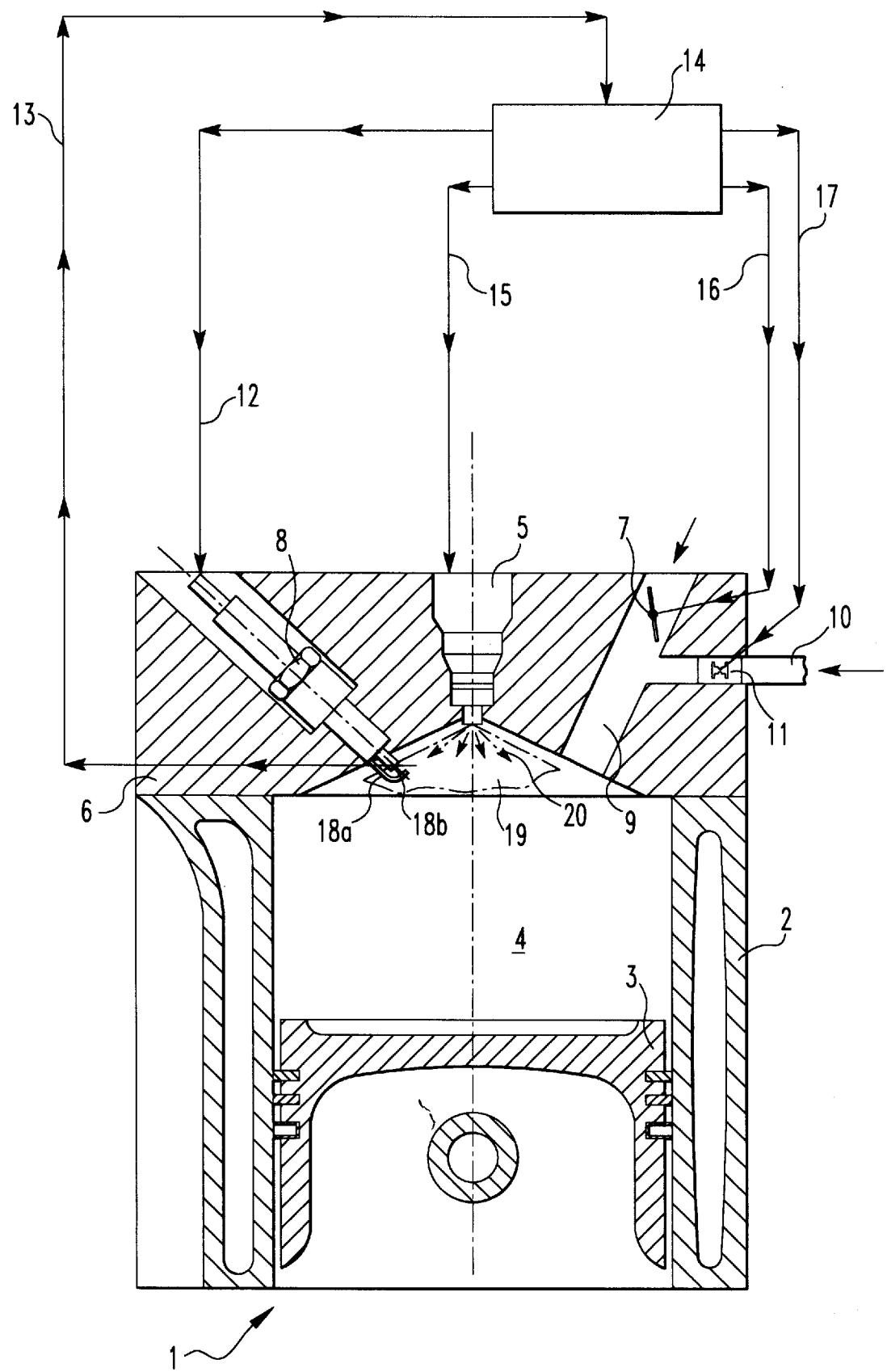

METHOD OF CONTROLLING AN ADJUSTABLE OPERATING PARAMETER OF AN INTERNAL COMBUSTION ENGINE WITH DIRECT FUEL INJECTION

BACKGROUND OF THE INVENTION

The invention relates to a method of controlling the adjustable operating parameters of an internal combustion engine with direct fuel injection which includes a cylinder with a piston forming a combustion chamber.

Air and fuel supplied to the combustion chamber of an internal combustion engine forms therein a fuel/air mixture, which is ignited by a spark formed between the electrodes of a spark plug. Under partial load, the mixture forms a stratified charge over a large engine operating range. The stratified charge is achieved by injection of the fuel during a relatively late phase of the compression stroke. In order to improve fuel consumption, and consequently, the efficiency of the engine, an internal mixture with high lambda values is desired wherein, depending on the engine load, a rich and consequently easily ignitable mixture is formed at the electrodes of the spark plug, but in the rest of the combustion chamber, the mixture becomes leaner with increasing distance from the electrodes of the spark plug.

Such an internal combustion engine is known, for example, from DE OS 43 24 642 A1.

The comparatively low $NO_x$— and CO emissions and the large amount of excess air present during stratified charge operation may lead to a deterioration of the operating behavior of the internal combustion engine by ignition misses and a slow combustion. A good operating behavior, that is smooth engine operation, is therefore usually achieved by substantial throttling of the intake air. This however leads to throttling losses of the engine performance. Known methods for the control of the adjustable operating parameters require extensive changes in the engine design in order to facilitate the continuous gathering of measurement data which give an indication of the operating state of the internal combustion engine on which an optimal adjustment of the engine operating conditions could be based.

It is therefore the object of the present invention to provide a method of controlling the adjustable operating parameters of an internal combustion engine with direct fuel injection, wherein without changes in the engine design, at every operating point individual measuring data with information concerning the respective engine operating condition can be determined on which data the operating state-dependent adjustment of the engine operating conditions can be based.

SUMMARY OF THE INVENTION

In a method of controlling adjustable operating parameters of an internal combustion engine with direct fuel injection which includes at least one cylinder having a piston delimiting a combustion chamber, a fuel injector and a spark plug, wherein air supplied to the combustion chamber through an air intake passage forms with the fuel injected by the fuel injector a fuel/air mixture which is compressed and produces a plasma cloud which is then ignited by a spark generated between the electrodes of the spark plug, the ionization degree of the plasma cloud is measured and an ionization signal is formed and supplied to an electronic control unit where it is utilized to control at least one operating parameter of the internal combustion engine.

During engine operation, the gas in the combustion chamber is ionized forming a plasma cloud. The degree of ionization of the plasma cloud formed in the combustion chamber is variable, but follows about the same pattern in each operating cycle of a cylinder. The ionization degree of the plasma cloud is furthermore temperature-dependent and provides for a measurable ion conduction which can be used to provide an ion flow signal. This ion flow signal permits a determination regarding certain operating conditions of the internal combustion engine, particularly with respect to the ignition and combustion behavior of the combustion chamber air and fuel charge. It is therefore possible, without engine design changes or without any constructional expenditures, to measure an engine operating parameter in a highly reliable fashion. Such operating parameter may then be used by an electronic control unit to adjust the engine to an optimal operating state, particularly with regard to emissions, to engine running smoothness and to fuel consumption.

The degree of ionization of the plasma cloud is preferably measured by a sensor extending into the combustion chamber and, consequently, into the plasma cloud. In this way, the respective engine operating condition can be measured precisely and reliably especially also during stratified charge-operation of the engine. It permits the generation of an ion flow signal indicative particularly of the running smoothness of the engine. The chances of ignition failure, for example, as a result of an excessively lean fuel/air mixture during stratified charge operation is therefore recognized early since, in this case, the ionization detected for a particular operating cycle of the engine differs from the known ideal ionization signal at a particular engine operating point.

In a particularly advantageous embodiment of the invention, the electrodes of the spark plug are used as the sensor for measuring the ionization degree of the plasma cloud. This requires no particular constructional provision since, because of their basic function, that is, igniting the fuel/air mixture formed in the combustion chamber, the electrodes of the spark plug extend sufficiently far into the combustion chamber that the ionization state of the plasma cloud can be determined sufficiently accurately to serve as a basis for controlling the engine operating parameters. The measurement of the ionization of the plasme or fuel cloud in the vicinity of the thermal energy source permits the generation of a particular representative and, with respect to the engine operating state, particularly indicative ionization signal.

If the engine includes an exhaust gas recirculation system with an exhaust gas recirculation line extending from the exhaust gas manifold of the engine to the intake manifold, the maximum exhaust gas recirculation rate can be limited by comparison of the ionization signal with a characteristic value known for this case. In this way, it is possible during stratified charge operation of the engine to supply to the combustion chamber the largest amount of inert exhaust gases, which is acceptable for the desired degree of engine running smoothness as replacement for the corresponding amount of oxygen-rich fresh air. By employing the largest possible exhaust gas recirculation rate acceptable without incurring ignition misses as a result of oxygen depletion or a lean fuel mixture, the noxious emissions of the internal combustion engine can be reduced to a minimum. Particularly under engine operating conditions with large amounts of excess air during idle or low load operation or during engine heat up, minimal amounts of $NO_x$ and CO gases are emitted. Furthermore, it is easily possible to control the smoothness of engine operation.

The method according to the invention for controlling the adjustable engine operating parameters on the basis of the varying ionization degree of the plasma cloud formed in the combustion chamber is particularly advantageous for the operation of a gasoline internal combustion engine with direct fuel injection.

An embodiment of the invention will be described below on the basis of the accompanying drawing.

BRIEF DESCRIPTION OF THE DRAWING

The sole FIGURE is a cross-sectional view of a cylinder and piston unit enclosing a combustion chamber.

DESCRIPTION OF A PREFERRED EMBODIMENT

As shown in the FIGURE, a piston 3 is movably supported in a cylinder 2 of an internal combustion engine defining a combustion chamber 4. The combustion chamber 4 includes a coneshaped end section within a cylinder head 6 which closes the cylinder 2. At the apex of the combustion chamber 4, an injector 5 is mounted into the cylinder head 6 such that it projects slightly into the combustion chamber 4 into which it injects a cone-like fuel beam 20. Fresh air forming with the directly injected fuel a fuel/air mixture is supplied to the combustion chamber 4 by way of an air intake passage 9, which includes a throttle valve 7 for controlling the flow of air supplied to the combustion chamber 4. A spark plug 8 is mounted into the cylinder head 6 and extends into the combustion chamber 4 such that the electrodes 18a, 18b project into the combustion chamber 4, whereby even a stratified charge of the combustion chamber with fuel injection during the compression stroke of he piston 3 can be ignited by a spark generated between the electrodes 18a, 18b. Downstream of the throttle valve 7, an exhaust gas recirculation line 10 originating from the exhaust manifold leads to the air intake passage 9. The exhaust gas recirculation line 10 includes a controllable exhaust gas recirculation valve 11 for controlling the exhaust gas recirculation flow.

During operation of the internal combustion engine 1, a plasma cloud 19 is formed in the combustion chamber 4. The plasma cloud 19 has a degree of ionization, which is temperature dependent and which, consequently, varies during a cycle of the internal combustion engine. The effect of the temperature on the ionization degree of the plasma cloud 19 permits accurate conclusions with regard to the operating conditions of the internal combustion engine 1, particularly with regard to the quality of the mixture combustion. The ionization of the plasma cloud is determined by measuring an ion flow across the electrodes 18a, 18b of the spark plug 8, which serves not only to provide a spark for the ignition of the fuel mixture, but also serves as a sensor for determining the ion conductivity of the plasma cloud 19. Because of the vicinity of plasma cloud to the thermal energy source, the ionization degree at the spark plug electrodes 18a, 18b is representative for the whole plasma cloud 19 since the plasma cloud 19 is formed with respect to the ion concentration, much like the fuel/air mixture is formed with respect to the fuel concentration. It is made sure that during stratified charge operation of the internal combustion engine 1 the sensor for measuring the ionization flow, that is, the electrodes 18a, 18b which extend into the fuel rich mixture area also extend into an area of the plasma cloud 19 where the ion concentration is sufficient for meaningful measurements.

The ion flow measurement at the electrodes 18a, 18b of the spark plug 8 provides an ion flow signal 13 which is supplied to an electronic control unit 14 and is utilized for the optimization of the operating parameters of the internal combustion engine 1. The control unit 14 provides an exhaust gas recirculation signal 17 with which the exhaust gas recirculation valve 11 is so adjusted that a maximum exhaust gas recirculation rate through the exhaust gas recirculation line 10 is maintained under the momentary operating conditions. Using the information provided by the ion flow signal concerning the smoothness of the operation of the internal combustion engine 1, the rate of exhaust gas recirculation may be selected so as to provide for a reduction of the raw emissions. At the same time the engine must he running smoothly. The engine running smoothness will suffer when the fuel/air mixture becomes excessively lean with an increasing amount of inert recirculated exhaust gas. The engine running smoothness must remain within a tolerable range. The maximum exhaust gas recirculation rate for a respective engine operating point is limited when the ion flow signal 13 reaches a predetermined value, providing for the maximum exhaust emission reduction achievable by way of exhaust gas recirculation, while maintaining engine running smoothness. In order to avoid throttle losses as much as possible, the fresh air flow through the air intake passage 9 is throttled by the throttle valve 7 depending on the position of the exhaust gas recirculation valve 11. The setting of the exhaust gas recirculation valve 11 is controlled by the exhaust gas recirculation signal 17 and the setting of the throttle valve 7 is controlled by the throttle signal 16, both provided by the control unit 15 in dependence on the ion flow signal 13.

The control unit 14 further determines the amount of fuel to be injected by the injector 5 specifically depending on the engine operating point and also the fuel injection timing by way of an injection signal supplied to the injector 5. It furthermore determines the ignition timing for igniting the fuel/air mixture in the combustion chamber 4 by providing an ignition signal 12 to the spark plug 8.

What is claimed is:

1. A method of controlling adjustable operating parameters of an internal combustion engine with direct fuel injection, said engine including at least one cylinder with a piston delimiting a combustion chamber provided with a fuel injector for injecting fuel into said combustion chamber, an air intake passage for supplying combustion air to said combustion chamber, a fuel injector for injecting fuel into said combustion chamber to form therein with the combustion air a fuel/air mixture, a spark plug with electrodes disposed in said combustion chamber for igniting said fuel/air mixture and an electronic control unit for controlling said engine operating parameters, said engine being operable over a large operating range under stratified charge conditions wherein fuel is injected into said combustion chamber in a controlled manner during a compression stroke of said piston such that a plasma cloud is formed within said combustion chamber, said method comprising the steps of measuring the ionization degree of the plasma cloud formed in said combustion chamber, providing an ionization signal to said electronic control unit and limiting the rate of exhaust gas recirculation from the engine exhaust to the engine air intake passage to a maximum value where said ionization signal reaches a predetermined characteristic value.

2. The method according to claim 1, wherein the ionization degree of said plasma cloud is measured by a sensor extending into said plasma cloud.

3. The method according to claim 2, wherein the electrodes of said spark plug are used as the sensor for measuring the ionization degree of said plasma cloud.

\* \* \* \* \*